Dec. 10, 1963  J. H. SPENCER  3,113,995
ISOLATION DEVICE FOR MOUNTING SCREWS
IN ELECTRICAL CONNECTION BOX
Filed March 1, 1960  2 Sheets-Sheet 1
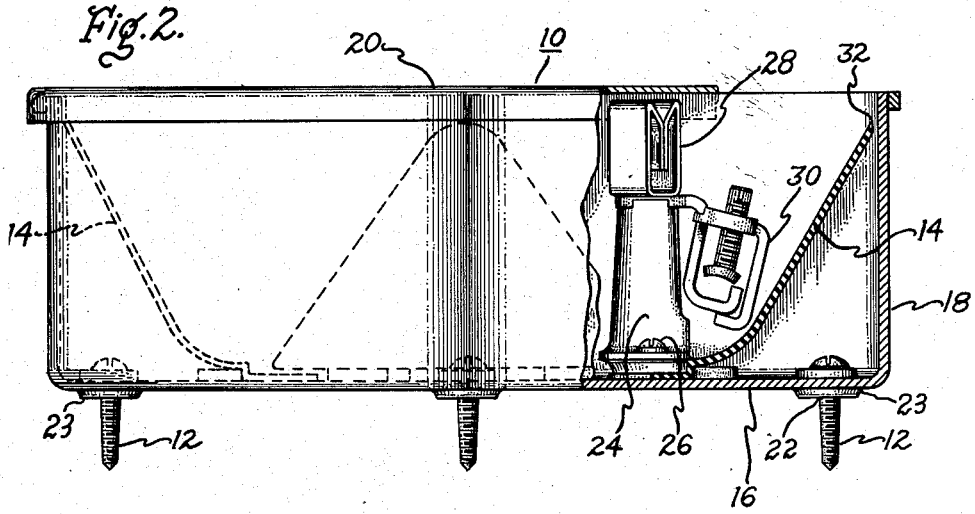
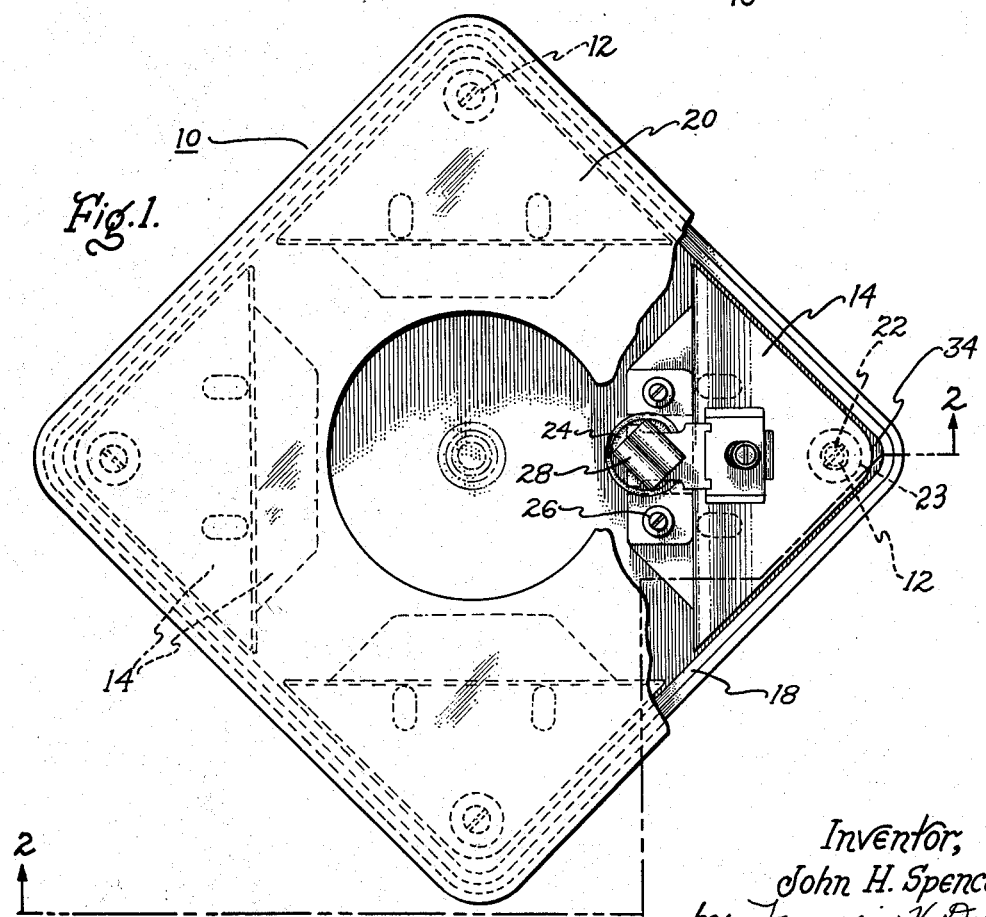
Inventor,
John H. Spencer,
by Francis K. Doyle
His Attorney.

Dec. 10, 1963 J. H. SPENCER 3,113,995
ISOLATION DEVICE FOR MOUNTING SCREWS
IN ELECTRICAL CONNECTION BOX
Filed March 1, 1960 2 Sheets-Sheet 2

Inventor,
John H. Spencer,
by Francis K. Doyle
His Attorney.

United States Patent Office 3,113,995
Patented Dec. 10, 1963

3,113,995
ISOLATION DEVICE FOR MOUNTING SCREWS IN ELECTRICAL CONNECTION BOX
John H. Spencer, Gonic, N.H., assignor to General Electric Company, a corporation of New York
Filed Mar. 1, 1960, Ser. No. 12,173
4 Claims. (Cl. 174—59)

This invention relates to an electrical box and, more particularly, to an electrical connection box being provided with a device for isolating the mounting screw of the electrical connection box from the energized connections of such connection box.

In electrical connection boxes such as, for example, meter sockets, service entrance panels, fuse boxes, and the like, it is the general practice in the art to mount these boxes on the side wall of a building by means of two or more mounting screws which extend through holes provided in the base of the electrical connection box. As is well known to those skilled in the art, these various electrical connection boxes are generally mounted for an extended period of time, measured in years. During these years of use, the mounting screws can become loose as a result of vibration or spreading of the wood in which the screws are mounted, or in case of externally mounted electrical connection box, ice may form between the base of the socket and the side wall of the building, thereby forcing the box away from such wall, and in time the mounting screw will become loose. During such accidental loosening of the mounting screws, it has been known for one or more of the mounting screws to fall into the electrical connection box and make contact between an electrically energized connection or terminal of the connection box and the grounded metal case, thereby causing a short circuit.

It is, therefore, one object of this invention to provide a means within the electrical connection box to isolate each of the mounting screws from the energized connections of the connection box.

It is a further object of this invention to provide an insulation piece within an electrical connection box in the vicinity of each mounting screw of the electrical connection box to positively prevent the mounting screw from coming in contact with any live connections or terminals of the electrical connection box.

In carrying out this invention in one form means are provided in the form of a piece of insulating material which is attached to the electrical connection box in a manner to close off a corner of the box wherein the mounting screw is to be placed. The insulating material confines the mounting screw to the corner of the connection box, thereby preventing the mounting screw, when loose, from falling into contact with any of the energized connections or terminals of the electrical connection box.

The invention sought to be protected, will be particularly pointed out in the claims forming a part of this specification. However, it is believed that the invention and the manner in which the specific objects, as well as other objects and advantages are obtained, will be better understood from the following description taken in connection with the accompanying drawing in which:

FIG. 1 is a side view of a closed electrical connection box having a portion of the cover broken away to show one form of the invention in the interior of the box;

FIG. 2 is a side view of an electrical connection box partially in section to more clearly show the details of the form of the invention shown in FIG. 1;

Figure 3:
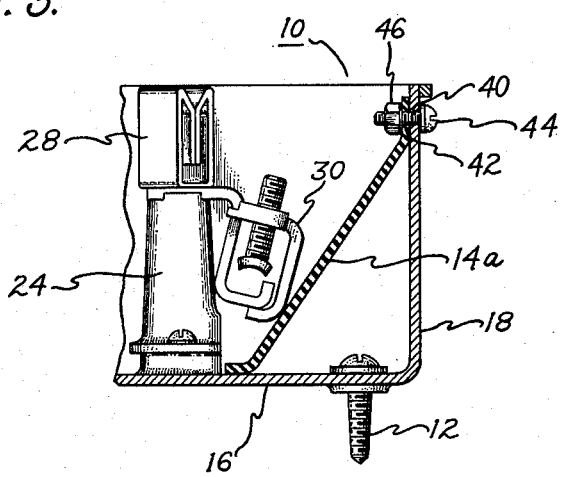
FIG. 3 is a fragmentary side view of a portion of an electrical connection box showing a modified form of the invention.

Referring now to the drawing, in which like numerals are used to indicate like parts throughout, there is shown an electrical connection box 10, which may be, for example, a meter socket or the like, having a plurality of mounting screws 12, which are utilized to mount the electrical connection box to the side or wall of a building (not shown). In order to isolate the mounting screw 12 to a corner of the electrical connection box 10 so that it will not come in contact with any of the electrically energized terminals or connections of the electrical connection box and thereby ground such energized connections to the grounded metal case of the junction box, a piece of electrical insulation material 14 is provided having one end thereof firmly fastened to a portion of the electrical connection box, while its sides and other end portion form a barrier against other portions of the electrical connection box so as to isolate the mounting screw 12 from the electrically energized terminals of the electrical connection box.

This invention will be described in greater detail in connection with a meter socket, however it is to be understood that this description is for the purposes of illustration only, and should be in no way considered as limiting the scope of the invention herein disclosed. It will be well understood by those skilled in the art that the invention may be applied in a similar manner to service entrance panels, fuse boxes, and other types of electrical connection boxes.

Referring now particularly to FIGS. 1 and 2 of the drawing, the electrical connection box 10 comprises a meter socket having a metal base 16, metallic side wall or walls 18 normally formed integrally with the base and a removable cover 20, the cover 20 being provided with a central aperture for receiving the meter (not shown) which is to be mounted on the meter socket as will be well understood by those skilled in the art. Four mounting holes 22 are provided in the base 16 of the meter socket for the reception of the four mounting screws 12. As shown, especially in FIG. 2, the mounting holes 22 are preferably provided in depressed bosses 23, which are formed in the base 16.

Terminal blocks 24 are provided in the meter socket in a well-known manner, each of the terminal blocks being firmly attached to the bottom 16 of the meter socket in any desired manner such as, for example, by means of the terminal block mounting screws 26. Attached to each of the terminal blocks 24 is a resilient terminal connector or jaw 28, which, as is well known to those skilled in the art, receives one of the various terminal blades or posts of a meter (not shown) when such meter is inserted within the meter socket. Also attached to each of the terminal blocks 24 is a cable clamping device 30 which is utilized to clamp either the load leads or the line leads to the various terminals of the meter socket.

In ordinary use the meter socket is mounted on the side of a building (not shown) either indoors or outdoors, by means of the mounting screws 12. A meter (not shown) is then inserted within the socket making connection with the various terminal jaws 28 and the cover 20 is then inserted over the meter socket enclosing the meter (not shown) within the meter socket in a weather-proofed manner as is well known to those skilled in the art. Since meter sockets are normally expected to remain in service for a number of years, normal service length being in the vicinity of thirty years, it is well known that in many instances through the years the mounting screws 12 become loosened due to vibration of the building and the effects of weather on the siding. On occasions, these loose mounting screws fall into the meter socket, short circuiting one of the energized terminals to the grounded meter socket box. In order to prevent any dislodged mounting screws 12 from short circuiting the live terminals or connections to the grounded base of the meter socket, the resilient insulating device 14 is provided. The insulating device 14 effectively isolates each of the mounting screws 12 to a single corner of the meter socket in the manner shown in FIGURES 1 and 2 of the drawing. In the preferred embodiment shown in FIGURES 1 and 2, the main portion of the resilient insulating piece 14 is in the form of a triangle. The apex 32 of the triangle is cut off to form an access opening 34 between the apex 32 of the triangular insulation piece and the corner of the meter socket as will be more fully explained hereafter. The portion of the resilient insulating piece 14 opposite the apex 32 is provided with an extension in the form of an isosceles trapezoid. This trapezoidal extension is preferredly mounted beneath the terminal block 24 and is secured to the base 16 of the meter socket 10 by means of the terminal block mounting screws 26, the shape and size of the resilient insulating piece 14 is designed and formed so that it will press against the sides 18 of the meter socket, closing off the corner in which the mounting screw 12 is mounted, except for the small access opening 34 at the top of the resilient insulating piece 14. When mounting the meter socket 10 on the side of a building, the resilient insulating piece 14 is drawn back against the cable clamp 30 by means of access opening 34 to form a sufficient opening for the insertion of the mounting screw 12 into the mounting hole 22. After the mounting screw 12 has been firmly secured to the side of the building, in a manner well understood to those skilled in the art, the resilient piece 14 is then released. The insulating piece 14 is formed from material such as vulcanized fiber sheet, so as to provide sufficient resiliency to snap back against the sides 18 of the meter socket 10 and to press thereagainst so as to close off the corner and effectively isolate the mounting screw 12 from the remainder of the meter socket. Of course, it will be understood that the remaining mounting screws are effectively isolated from the rest of the meter socket in a similar manner, the remaining insulating pieces being shown in dotted lines in FIGURES 1 and 2 of the drawing.

Figure 4:
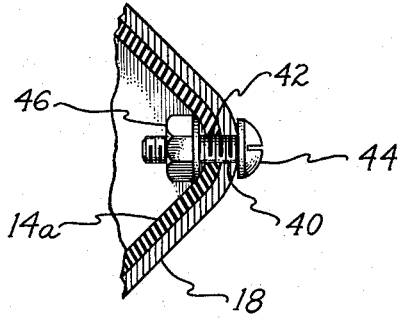
FIG. 4 is a detail of FIG. 3 showing one form of securing the insulating material to the electrical connection box.

Referring now to FIGS. 3 and 4 of the drawing, a modified form of the invention is shown. In this form of the invention an insulating piece 14a is shown secured to the electrical connection box 10 and closing off the corner of the box 10 where the mounting screw 12 is placed. In this form of the invention the insulating piece 14a is preferably triangularly shaped, with the apex of the triangle fitting flush with the corner of the box 10, as clearly shown in FIGS. 3 and 4. A hole 40 is formed in the corner of the box 10, and a comparable hole 42 is formed in the piece 14a. A bolt 44, or similar securing means, is passed through the holes 40, 42 and a nut 46 is tightened thereon to firmly secure the insulating piece 14a to the electrical connection box. The base portion of the insulating piece 14a merely rests against the base 16 of the electrical connection box 10, preferably adjacent the terminal member 24.

In mounting the electrical connection box 10 to the wall of a building (not shown) the insulating pieces 14a are first removed. The box 10 is then mounted in the normal manner. Insulating pieces 14a are then replaced in their positions as shown in FIGS. 3 and 4, and as hereinbefore described. With the insulating pieces 14a in place, each of the mounting screws 12 are effectively confined to a corner of the electrical connection box 10.

Of course, it will be understood that the insulating material of the piece 14a may be the same as that specified for piece 14. However, since substantially no resiliency is required of the piece 14a it may be made of any desired rigid insulating material. The only requirement of the material of piece 14a is that it be sufficiently rigid to prevent a loose mounting screw 12 from falling past the insulating piece and into contact with a line terminal or connection in the electrical connection box 10.

An added advantage which is obtained by the use of the insulating pieces 14 or 14a is the prevention of the line cables from shorting against the base 16 of the electrical connection box 10 when being fastened to the cable clamps 30.

While there has been shown and described the preferred embodiments of the invention relating to its use in meter sockets, it will be well understood by those skilled in the art that the invention is applicable to any type of electrical connection box being provided with mounting screws and having energized terminals or connections within the connection box, such that a dislodged mounting screw may form a short circuit between such energized terminal of the connection box and a grounded portion of the metal case. Further, it will be understood that various changes may be made in the size, shape, material and mounting of the insulating device as may be desired, without departing from the inventive concept disclosed in this application. Therefore, it should be understood that the preceding description is for purposes of illustration only and that the invention is not to be considered as limited thereby, but rather it is intended to cover all such modifications as fall within the true spirit and scope of the invention as defined in the appended claims.

What is claimed as new and is desired to be secured by Letters Patent of the United States is:

1. A metallic electrical connection box provided with means for preventing a mounting screw from contacting a live terminal of the box comprising, a metallic base member, at least one metallic side wall member, said base member and said side wall member being firmly secured together to form a box-like enclosure, mounting holes in said base member, a mounting screw in each said mounting hole for securing said metallic box to a support, energized terminals in said box, said terminals being secured by insulation means to said metallic box, and insulation members substantially triangularly shaped secured to said box near each said mounting screw, each of said insulation members contacting said base member between one of said mounting screws and one of said terminals, and the sides of each of said insulation members contacting said side wall of said box about each of said mounting screws to thereby isolate each of said mounting screws from said terminals in said box.

2. An electrical meter box provided with means for preventing a mounting screw from contacting a live meter terminal of the box comprising, a metallic base member, a mounting screw in said base member for attaching the meter box to a side wall of a building, a meter terminal mounted on said base member adapted to be energized by a source of electricity, a resilient insulating member, means attaching said insulating member to the base of the meter box and in firm contact with a side wall of the box, between said screw and said terminal, said resilient member and said side wall enclosing said mounting screw to thereby form a barrier between said mounting screw and said terminal.

3. An electrical meter box having means for preventing a mounting screw from contacting a live meter terminal of the box comprising, a metallic base member, a mounting screw in said base member for attaching the meter box to a side wall of a building, a meter terminal mounted in the box and adapted to be energized by a source of electricity, an elongated resilient insulating member, means attaching one end of said insulating member to a side wall of the electrical meter box, said insulating member extending from said side wall to said base of the box between the mounting screw and the live terminal, said insulating member making firm contact with said side wall and said base enclosing said mounting screw between said insulating member and said side wall thereby forming a barrier between said mounting screw and said live terminal.

4. An electrical connection box provided with means for preventing a dislodged mounting screw from short circuiting an energized terminal thereof, comprising a metallic base portion, said base portion being provided with mounting holes, a metallic side wall firmly attached to said base and forming a box-like enclosure, a mounting screw passing through one of said mounting holes and adapted to firmly attach the electrical connection box to the side wall of a building, a terminal within the box firmly secured to said base, a connection to said terminal adapted to be energized by a source of electrical energy, and a resilient insulating piece firmly mounted beneath said terminal in contact with the base portion of said electrical connection box, the sides of said resilient insulating piece being pressed into contact with the side wall of the electrical connection box about the mounting screw to thereby form an insulating barrier between the mounting screw and the energizable terminal of the electrical connection box to prevent the mounting screw from shorting the energizable terminal to the metallic portions of the electrical connection box.

References Cited in the file of this patent

UNITED STATES PATENTS

| | | |
|---|---|---|
| 1,564,321 | Cameron | Dec. 8, 1925 |
| 2,224,235 | Van Valkenburg | Dec. 10, 1940 |
| 2,641,636 | Born et al. | June 9, 1953 |
| 2,740,001 | Vergilio et al. | Mar. 27, 1956 |
| 2,808,449 | Nicholas | Oct. 1, 1957 |

FOREIGN PATENTS

| | | |
|---|---|---|
| 473,268 | Italy | July 21, 1952 |
| 473,725 | Italy | Aug. 9, 1952 |
| 324,071 | France | Mar. 23, 1903 |
| 824,056 | France | Feb. 1, 1938 |
| 3,763 | Great Britain | Mar. 9, 1915 |
| 889,181 | Germany | Sept. 7, 1953 |

OTHER REFERENCES

German application, 1,066,257, Oct. 1, 1959.